United States Patent [19]

Wachs et al.

[11] Patent Number: 5,731,993
[45] Date of Patent: Mar. 24, 1998

[54] NONLINEAR AMPLIFIER OPERATING POINT DETERMINATION SYSTEM AND METHOD

[75] Inventors: Marvin R. Wachs, Calabasas; Arnold L. Berman, Los Angeles, both of Calif.

[73] Assignee: Hughes Electronics, Los Angeles, Calif.

[21] Appl. No.: 709,971

[22] Filed: Sep. 9, 1996

[51] Int. Cl.[6] ..................................................... G05B 13/02
[52] U.S. Cl. ........................................... 364/553; 364/483
[58] Field of Search .................................... 364/553, 157, 364/481–485, 487; 455/12.1–13.4; 324/615–619; 330/2; 375/224

[56] References Cited

U.S. PATENT DOCUMENTS

| | | | |
|---|---|---|---|
| 3,973,112 | 8/1976 | Sloane | 364/553 |
| 4,067,060 | 1/1978 | Poussart et al. | 364/553 |
| 4,667,296 | 5/1987 | Crowe | 364/553 |
| 4,692,299 | 9/1987 | Crew et al. | 364/553 |
| 4,860,227 | 8/1989 | Tamamura | 364/553 |
| 5,175,698 | 12/1992 | Barbnnell | 364/553 |
| 5,493,516 | 2/1996 | Broomhead et al. | 364/553 |
| 5,555,507 | 9/1996 | Wolf et al. | 364/553 |
| 5,602,765 | 2/1997 | Tanaka et al. | 364/553 |

OTHER PUBLICATIONS

W. H. Kummer, "Basic Array Theory", *Proceedings of the IEEE*, vol. 80, No. 1, 1992, pp. 127–138.

*Primary Examiner*—James P. Trammell
*Attorney, Agent, or Firm*—Terje Gudmestad; Elizabeth E. Leitere; Wanda K. Denson-Low

[57] ABSTRACT

The operating point of a nonlinear amplifier is determined by injecting a known test signal into the communication channel and measuring the gain of the amplified test signal. Each amplifier is characterized by a small signal gain curve that relates the gain of the test signal to the input power of the amplifier. In the amplifier's nonlinear range, the gain uniquely determines the input power level of the amplifier, which in turn uniquely determines the operating point of the amplifier. The invention is particularly applicable to satellite transponder architectures that employ "burst" transmission schemes and phased array antennas.

17 Claims, 5 Drawing Sheets

NONLINEAR AMPLIFIER OPERATING POINT DETERMINATION SYSTEM AND METHOD

BACKGROUND OF THE INVENTION

1. Field of the Invention

This invention relates to determining the operating point of nonlinear amplifiers in order to optimize their performance, and more specifically to a system and method for injecting small amplitude test signals into signal paths on board a satellite and using each amplifier's small signal gain compression to determine its operating point.

2. Description of the Related Art

Amplifiers are commonly used to boost signal power in many applications such as audio systems or communication satellites. A solid state power amplifier (SSPA) or a traveling wave tube amplifier (TWTA) is linear only if the input power is below a certain level, as shown in the linear segment 2 of the output power versus input power (Pout v. Pin) curve 4 of FIG. 1a. When the input power level is increased beyond the linear region, the amplifier saturates and the segment 6 of the Pout v. Pin curve 4 exhibits nonlinear characteristics in the nonlinear region. SSPAs and TWTAs are the two types of amplifiers most commonly used for satellite applications. The SSPA's Pout v. Pin curve 8 rolls off at saturation and becomes flat at high input power levels. The TWTA's Pout v. Pin curve 10 in the nonlinear region peaks at saturation and falls off when the amplifier is overdriven. The amplifier gain characteristics can also be represented in a curve 5 of small signal gain v. Pin, as shown in FIG. 1b. In the linear region, the small signal gain is constant. In the nonlinear region, the small signal gain curve falls off.

The amplifier's nonlinearity, when driven by multiple carriers, results in the generation of additional spectral components known as intermodulation products (intermods or IMs). These intermods behave as an additional source of noise in the communications system and reduce performance. The level of intermods is, to a large extent, determined by the nonlinear characteristic, the input drive level (or operating point), and the parameters of the input carriers. As the input drive level is increased, the desired signal power increases thus increasing the carrier to thermal noise ratio, but the intermod level also increases thus decreasing the carrier to intermod noise ratio. The optimal operating point of an amplifier is found at the input power level at which the carrier to thermal noise and carrier to intermod noise ratios are equal.

In communication systems, it is important to know each amplifier's operating point and how far it is from the amplifier's optimal operating point in order to control operation, reduce noise and maximize power efficiency. In conventional systems, the operating point can be determined by directly measuring either the amplifier's input power or its output power. However, in other systems it is not practical or even possible to directly measure the power levels. In these cases, a remote power level is measured and then translated back to the amplifier to estimate the operating point. The gain or loss between the amplifier and the power measurement is characterized by link budgets, which may not be accurately known and may vary with time in an unknown manner. As a result, the measured operating point may not accurately represent the true operating point, and thus any compensation to the drive signal or the amplifier itself may actually reduce the amplifier's performance instead of improve it.

Future communications satellites are expected to use phased array antennas in which each array element is driven by a different amplifier. As described in W. H. Kummer, "Basic Array Theory", *Proceedings of the IEEE*, Vol. 80, No. 1, 1992, pages 127–138, the channels are weighted and applied to each array element to transmit respective beams to the Earth. The weighting controls the shape and orientation of each beam. Because the outputs of the array elements are spatially combined to form the beams, the operating points for each amplifier cannot be determined by simply measuring the beams' powers at the Earth station. Furthermore, to even measure the total power of each beam would require an Earth station for each of the beams at the different illuminated positions on the Earth.

SUMMARY OF THE INVENTION

The present invention provides a system and method for accurately, uniquely and reliably determining the operating point of a nonlinear amplifier, and specifically for determining the operating points of a satellite transponder in systems that use a "burst" transmission or time division multiple access (TDMA) scheme, or in systems which allow momentary interruption in communications traffic or employ a phased array antenna driven by multiple amplifiers.

This is accomplished by providing a test signal generator that injects a known test signal into a signal path so that it is combined with the channel input signal and applied to the nonlinear amplifier. A power measuring device such as a power meter or spectrum analyzer measures a reference power level for the test signal with the communications carrier in an off state, and then measures the output power level of the test signal when the communications carrier signal is present. A readout circuit compares the operating power level to the reference power level to compute the gain of the test signal, and then uses the small signal gain curve to map the gain to the amplifier's input power level. The measurement system may be either at a ground station or on board a satellite. As a result, the amplifier can be accurately tuned to operate at its optimal operating point. Furthermore, the injected test signals can also be used for troubleshooting.

In satellite transponder architectures, known test signals are injected into the signal paths and applied to respective amplifiers. A power meter and readout circuit together measure the gain of each of the test signals and compute the operating point for each of the amplifiers. In "burst" transmission or TDMA systems, the reference power level is automatically recalibrated whenever the carrier traffic is in an off state, which improves the accuracy of the operating point. In communications systems with other transmission schemes, the carrier traffic may be intentionally interrupted to allow for measurement of the reference power level. In satellites with phased array antennas, the invention separates the spatially integrated beam into its constituent elements so that each amplifier's operating point can be determined. Furthermore, the reference power level can be recalibrated by deactivating the array elements one at a time, which has a negligible effect on the whole antenna beam.

These and other features and advantages of the invention will be apparent to those skilled in the art from the following detailed description, taken together with the accompanying drawings, in which:

BRIEF DESCRIPTION OF THE DRAWINGS

FIG. 5b is a plot of typical small signal gain corresponding to the "burst" transmission in FIG. 5a;

DETAILED DESCRIPTION OF THE INVENTION

In the present invention, an amplifier's operating point is determined by injecting a small amplitude test signal into the input signal channel, measuring the small signal gain, and using the amplifier's small signal gain compression curve to determine the amplifier's operating point. The invention is generally applicable to determine any amplifier's operating point but will provide the greatest performance advantages in communications systems in which the amplifier's input and output power are conventionally generated and measured, respectively, at remote locations. The invention is also particularly applicable to the more recent, although well known, satellite technologies of time division multiple access (TDMA), "burst" transmission, and phased array antennas.

Figure 1A:
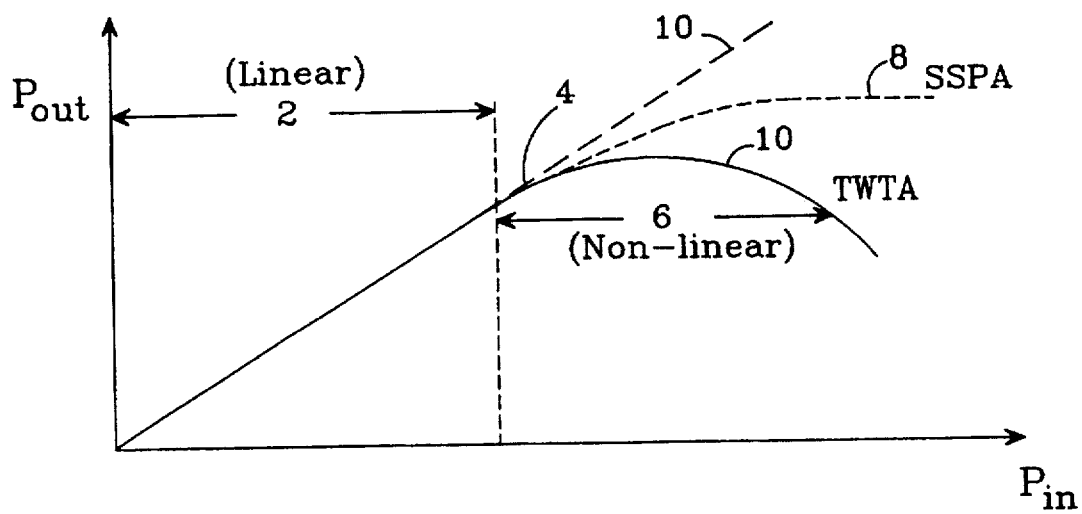
FIG. 1a, described above, is a typical plot of output power versus input power (Pout v. Pin) for nonlinear amplifiers, including a curve for a SSPA and a curve for a TWTA.
Figure 1B:
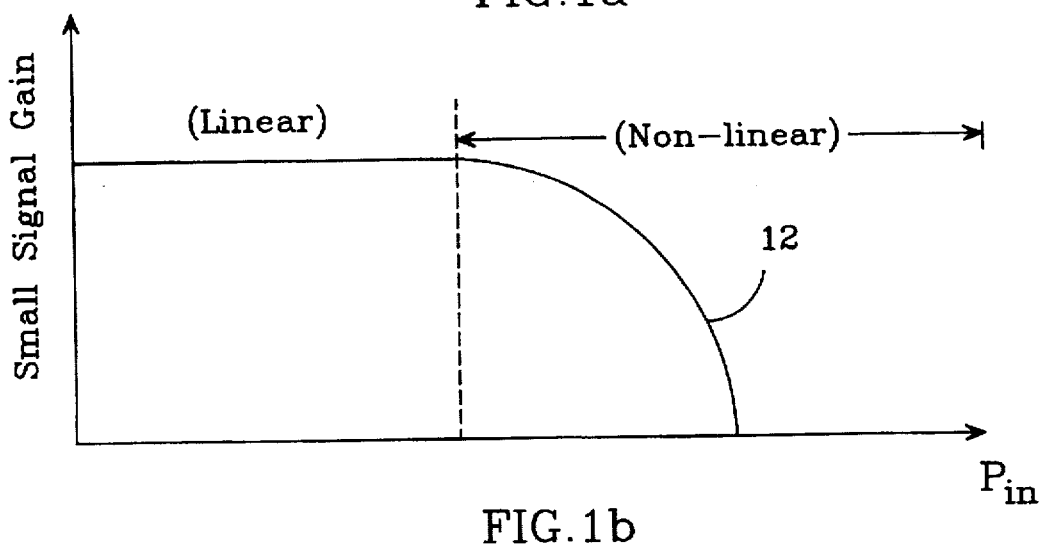
FIG. 1b, described above, is a typical plot of small signal gain versus input power for nonlinear amplifiers.
Figure 2:
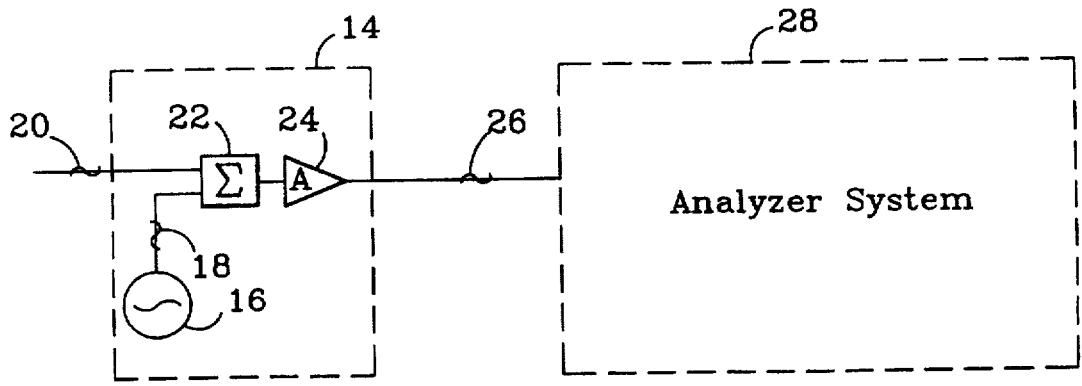
FIG. 2 is a block diagram of a system in accordance with the present invention for determining the nonlinear amplifier's operating point.

The performance of a nonlinear amplifier can be characterized by an output power versus input power curve as in FIG. 1a, or by a small signal gain curve as in FIG. 1b. In a simplified representative satellite channel transponder 14 as in FIG. 2, a test signal generator 16 generates a small test signal 18 which is added to a channel input signal 20 in a summing circuit 22, and the summed signals are amplified by the amplifier 24. The amplified signal 26 is then transmitted to an analyzer system 28, which may be either at a ground station or on board a satellite.

The small signal gain at any input power level is directly related to the output power of the test signal at that input power level, which is the sum of the channel signal power and the test signal power. The output power of the test signal remains constant as long as the total input power is in the linear region. To establish a reference power level for the test signal output power, the amplifier must be driven in the linear region. In a preferred embodiment, the reference output power level of the test signal is measured when the channel input signal 20 is in an off state. As the amplifier is driven into the nonlinear region by the channel input signal, the gain of the test signal falls off. In the nonlinear region, the output power of the test signal is smaller than the reference test signal output power. The difference between these power levels is directly related to the small signal gain compression.

The test signal may be generated in several ways. One method is to simply generate a continuous wave tone at a frequency that is offset from the carrier signal but is still within the channel's passband. Preferably, the test signal frequency is near the band edge of the channel's passband to minimize interference with communications signals. Another approach is to use spread spectrum pseudo-random codes for test signals so that the test signals can be transmitted at the same frequencies as the communications signals. In this implementation, the pseudo-random codes of the test signals are approximately orthogonal to the codes in the communications channel, so that interference between test signals and communications signals can be minimized. However, the analyzer must have a decoder to separate the test signal from the communications signal. This method is more complicated than the continuous wave test signal scheme but can nearly eliminate the interference problem.

Two requirements for test signals are that the frequency and modulation schemes must be known and that the test signal's power level be low compared to the maximum total input power. Preferably, the input power of the test signal is on the order of 20 dB below the maximum total input power.

Figure 3:
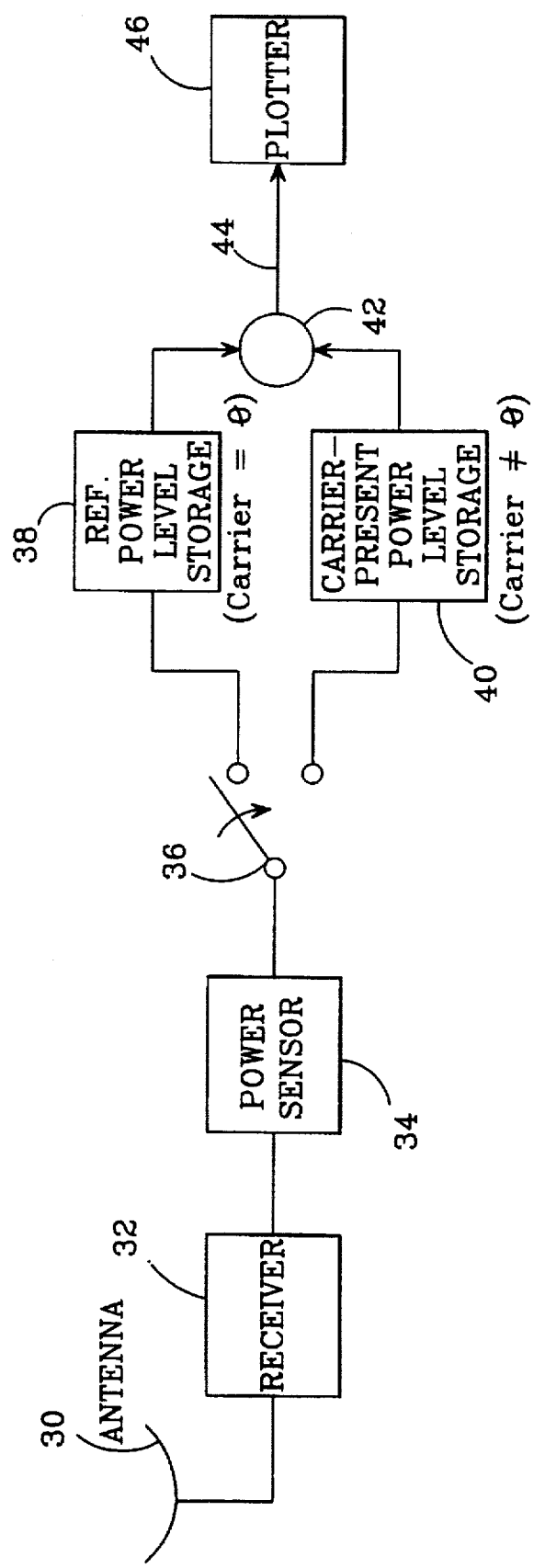
FIG. 3 is a block diagram of one implementation of the power measurement system.

There are several possible schemes for measuring the test signal power levels and analyzing the small signal gain curve. FIG. 3 shows one such scheme for a ground-based analyzer system. In a preferred embodiment, the amplified signals combining the test signal and the channel carrier signal are collected from a ground station antenna 30 by a receiver 32. The power of the received test signal is measured by a power sensor 34 such as a power meter or a spectrum analyzer. At the output of the power sensor 34 a control switch 36, controlled either manually or automatically in accordance with whether the carrier signal is on or off, routes the power sensor output to a reference power level storage 38 if the carrier is off and to a carrier-present power level storage 40 if the carrier is on. In a communication system employing "burst" transmission, the switch is preferably controlled by a timer synchronized to the on and off states of the "burst" transmission. The reference power level is subtracted from the carrier-present power level by a subtracter 42 and the resulting differential power level 44 is either recorded in a tabular form or plotted in a recorder or plotter 46 as a function of combined input power level of the channel carrier signal and the test signal, in both the linear region and the nonlinear region. The resulting curve of the differential power level versus the total input power is the small signal gain curve where the optimal operating point is found.

Figure 4:
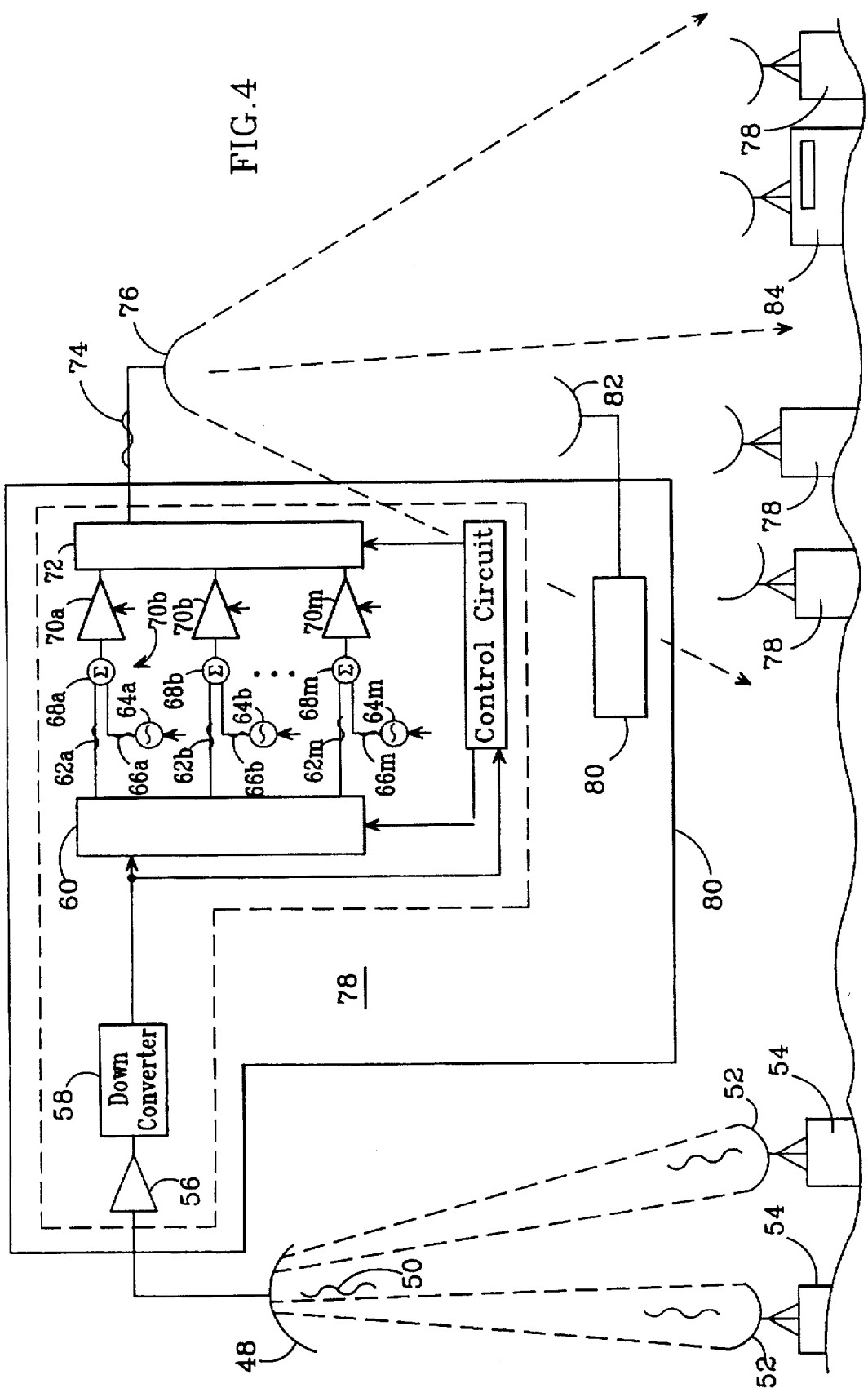
FIG. 4 is a block diagram of a multi-channel satellite architecture that incorporates an on-board analyzer for measuring power levels.

FIG. 4 shows an embodiment of an analyzer system on board a satellite with a multi-channel transponder architecture. A satellite receive antenna 48 receives uplink signals 50 from the transmit antennae 52 of ground stations 54. The received signals are amplified by a pre-amplifier 56 and downconverted in frequency by a downconverter 58. The downconverted signals are channelized by a bank of bandpass filters 60 into a plurality of channelized carrier signals, 62a, 62b, . . . 62m. For each channel there is a test signal generator 64a, 64b, . . . 64m. The test signals 66a, 66b, . . . 66m generated by their respective test signal generators 64a, 64b, . . . 64m are added to the respective carrier signals 62a, 62b, . . . 62m in summing circuits 68a, 68b, . . . 68m. The summed signals are amplified by their respective channel amplifiers 70a, 70b, . . . 70m. The amplified channel signals are combined in a multiplexer 72, and the combined signals 74 are sent to a satellite transmit antenna 76 to downlink the signals to one or more ground stations 78.

An analyzer 80 is placed on board the satellite to measure the test signal output power levels from the respective channel amplifiers 70a, 70b, . . . 70m from an antenna 82 that receives the signals from the transmit antenna 76. As an alternative, the analyzer 80 may tap the output power directly from the output of the multiplexer 72. The analyzer performs power measurements of the test signal of any one of the channels when the carrier is on and when the carrier is off, and computes the respective gain values to determine each amplifier's operating point. The results are transmitted to a ground station 84 that receives telemetry signals.

Figure 5A:
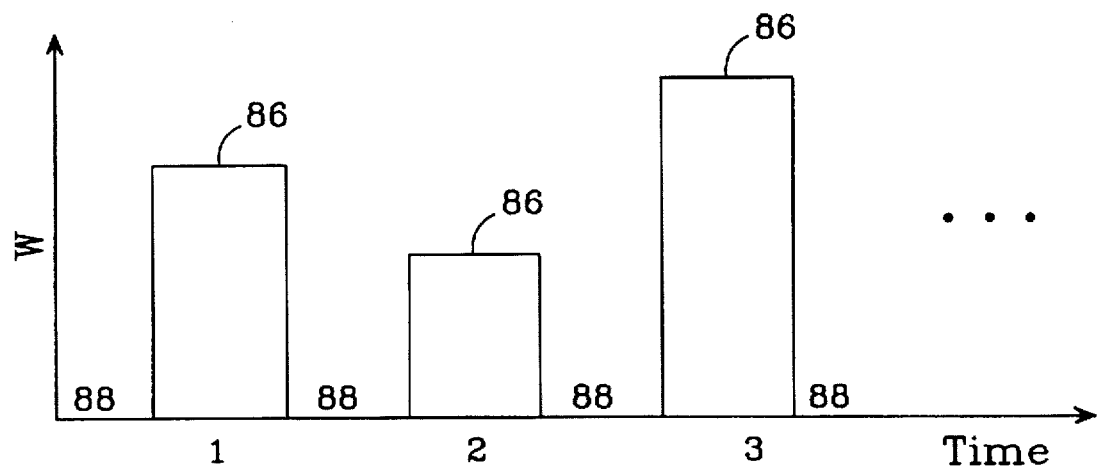
FIG. 5a is a typical plot of "burst" transmission input signals as a function of time.
Figure 5B:
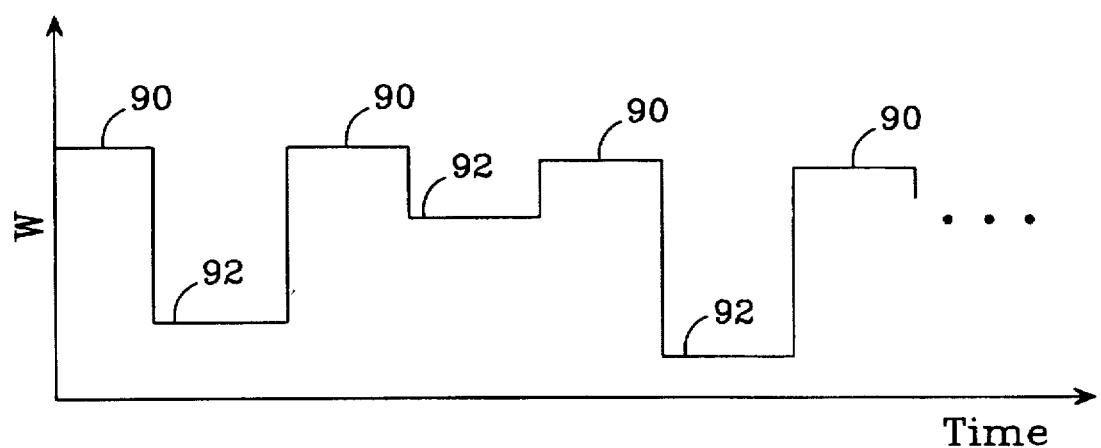

FIG. 5a shows a typical series of "burst" transmission signals in the time domain. The bursts 86 can have different carrier input power levels. Between the bursts 86 are gaps 88 during which the carrier signals are off and only the test signals are on. FIG. 5b shows a typical plot of small signal gain for a nonlinear amplifier to which bursts 86 are applied, plotted to the same time scale as FIG. 5a. In the gaps at which the carrier power is absent, the small signal gain 90 of the amplifier is referenced to 0 dB. During the bursts the carrier input signals drive the amplifier into the nonlinear region, causing the small signal gain 92 of the amplifier to drop below 0 dB. The small signal gain decreases further when the burst transmission power increases. In a "burst" transmission system, it is preferred that the power measurements be synchronized by a time clock to establish the reference test signal power level between the bursts and the combined power levels during the bursts, so that small signal gain compression can be readily determined from the difference between the reference power level and the power levels during bursts.

The method is especially useful in a "burst" transmission system where the reference test signal power level drifts over time. At every gap 88, the reference power level may be automatically remeasured to provide comparison with the power level measurement during a burst that is adjacent to the gap. In this way, the reference power level is updated frequently to reduce the effect of drift in the reference power level on the calculating the gain of the test signal.

Figure 6:
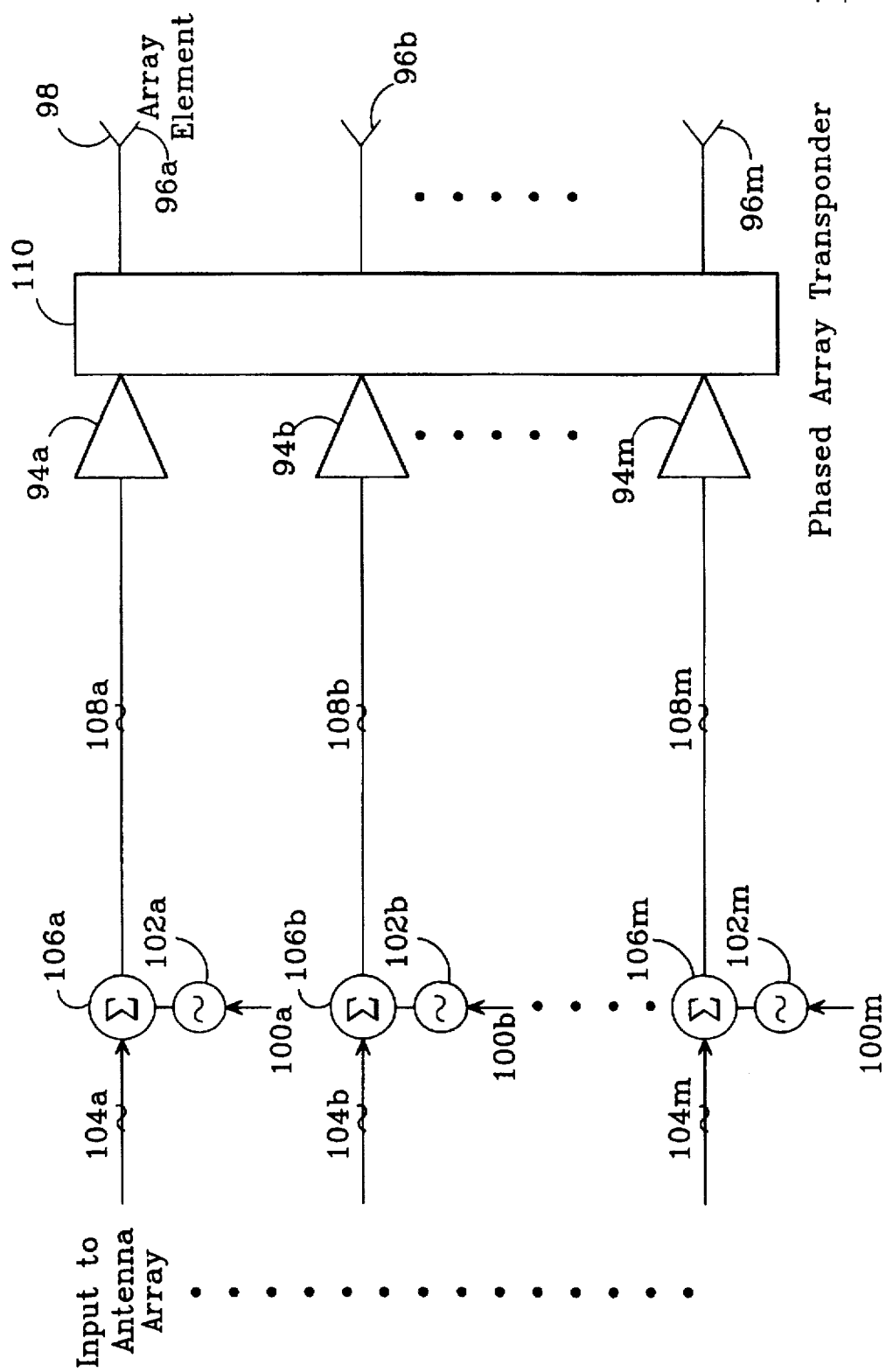
FIG. 6 is a block diagram of a phased array transponder system with a test signal injected before each amplifier in the phased array beam forming network.

FIG. 6 shows an implementation of a operating point determination system in a phased array transponder system. In a phased array system, an array of amplifiers 94a, 94b, . . . 94m each drives a separate element 96a, 96b, . . . 96m of the phased array antenna 98. In a preferred embodiment, a plurality of test signal generators 100a, 100b, . . . 100m generate test signals 102a, 102b, . . . 102m respectively. The test signals 102a, 102b, . . . 102m are added to the input signals 104a, 104b, . . . 104m in their respective summing circuits 106a, 106b, . . . 106m. The summed signals 108a, 108b, . . . 108m are then amplified by their respective amplifiers 94a, 94b, . . . 94m. The amplified signals are converted to the phased array antenna's transmit frequency by an upconverter 110, which feeds the signals to the array elements 96a, 96b, . . . 96m of the phased array antenna 48. The analyzer system may be either ground based or on board the satellite and may be implemented in any of the configurations described above, such as those illustrated in FIGS. 3 and 4.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A system for measuring the operating point of a nonlinear amplifier, comprising
 a transponder which comprises:
  a test signal generator capable of generating an input test signal;
  an input communication channel capable of carrying a communication carrier signal;
  a summing circuit connected to combine said input test signal and said communication carrier signal to produce a summed signal; and
  a nonlinear amplifier connected to receive said summed signal, and to generate an amplified summed signal; and
 an analyzer for establishing the small signal gain of said amplifier, comprising:
  a receiver for receiving said amplified summed signal; and
  a power sensor connected to sense the test signal component of the amplified summed signal's power as an indication of the amplifier's operating point.

2. The system of claim 1, wherein said test signal generator generates said input test signal as a continuous wave signal at a frequency different from the frequency of said communication carrier signal.

3. The system of claim 1, wherein the input test signal generated by said test signal generator is a pseudo-random coded signal.

4. The system of claim 1, wherein said power sensor comprises a power meter.

5. The system of claim 1, wherein said power sensor comprises a spectrum analyzer.

6. The system of claim 1, wherein said analyzer is on the Earth.

7. The system of claim 1, wherein said analyzer is on board a satellite, further comprising a transmit antenna for transmitting data from said analyzer output to a ground station.

8. The system of claim 1, wherein said transponder is a phased array system, further comprising a phased array antenna having a plurality of transmitting elements and a plurality of said amplifiers providing amplification for respective transmitting elements.

9. The system of claim 1, wherein said analyzer further comprises a power comparator connected to said power sensor.

10. The system of claim 9, wherein said power comparator comprises:
  a reference power level storage connected to store the sensed power level of the amplified test signal when the carrier signal is off;
  a carrier-present power level storage connected to store the sensed power level of the amplified test signal when the carrier signal is on;
  a switch which connects the output of said power sensor to said reference power level storage when said carrier signal is off and to said carrier-present power level storage when said carrier signal is on;
  a subtracter for computing the difference between the carrier-present power level and the reference power level from said reference power level storage and said carrier-present power level storage; and
  a recorder for recording the output from said subtracter over a range of input carrier power levels as an indication of the amplifier's power transfer curve.

11. A method for determining a nonlinear amplifier's power transfer characteristic, comprising:
 generating a channel input signal;
 generating a known test signal;
 combining the test signal with the channel input signal to drive the nonlinear amplifier at one time, and driving the amplifier with the test signal by itself at another time;
 measuring the gain imparted by the amplifier to the test signal;

measuring the gain imparted by the amplifier to the test signal when combined with the channel input signal;

comparing the gain imparted by the amplifier to the test signal when the amplifier is driven in its linear range by said test signal alone and in its nonlinear range by the combined test and channel input signals to provide an indication of the amplifier's power transfer characteristic.

12. The method of claim 11, further comprising:

generating a small signal gain curve for the amplifier from said comparison over a range of channel input signals, said small signal gain curve uniquely relating the gain of a known test signal to the amplifier's input power level in its nonlinear range;

obtaining the amplifier's gain compression characteristic from said small signal gain curve;

determining the amplifier's operating point from said gain compression characteristic.

13. The method of claim 11, wherein said channel input signal is within a known bandwidth and has a maximum input power, said known test signal being generated as a single frequency fixed amplitude signal which is injected into said known bandwidth at a frequency that is unused by said channel input signal at a power level that is at least 20 decibels less than the input signal's maximum input power.

14. The method of claim 11, wherein said channel input signal is within a known bandwidth and uses a spread spectrum code, said test signal being generated as a pseudorandom coded signal that is distributed across said bandwidth and is approximately orthogonal to the spread spectrum code of said channel input signal.

15. The method of claim 11, wherein the gain of the known test signal is obtained by:

measuring a reference power level for the test signal when the amplifier is driven in its linear region;

measuring an operating power level for the test signal when the input and test signals together drive the amplifier into its nonlinear region; and calculating the difference between the operating power level and the reference power level to yield the gain of the test signal.

16. The method of claim 11, wherein the gain of the known test signal is obtained by:

measuring a reference power level for the test signal when the known test signal is on and the channel input signal is off;

measuring an operating power level for the test signal when the input and test signals together drive the amplifier into its nonlinear region; and calculating the difference between the operating power level and the reference power level to yield the gain of the test signal.

17. The method of claim 16, wherein the reference power level drifts over time, said channel input signal is generated in bursts, and between bursts the reference power level is automatically remeasured to reduce the effects of drift on the calculated gain of the test signal.

* * * * *